Figure 1:
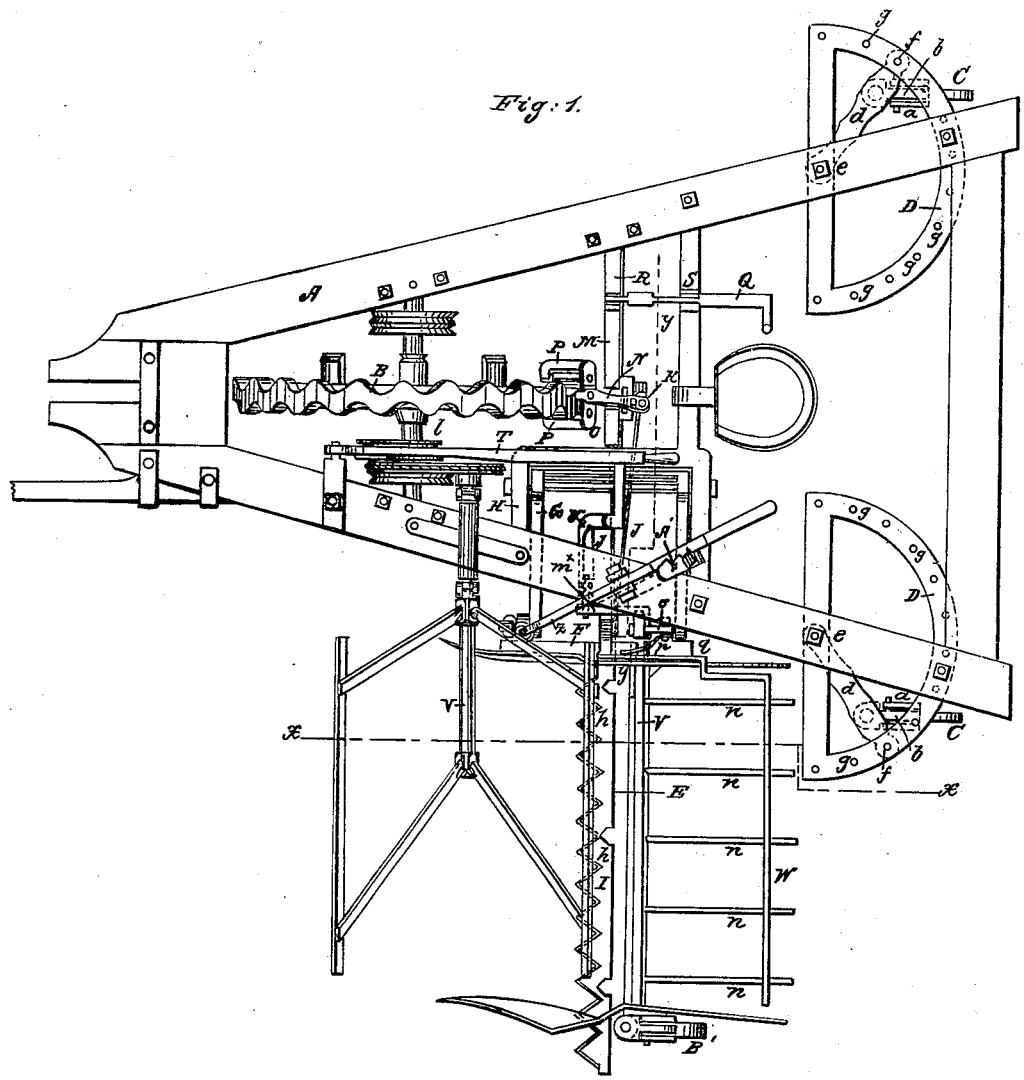

D. S. FISHER.
Harvester.

No. 73,314.

2 Sheets—Sheet 1.

Patented Jan'y 14, 1868.

Witnesses:
Theo Tusche.
J. A. Service.

Inventor:
D. S. Fisher
Per Munn & Co.
Attorneys.

D. S. FISHER.
Harvester.
No. 73,314.
2 Sheets—Sheet 2.
Patented Jan'y 14, 1868.
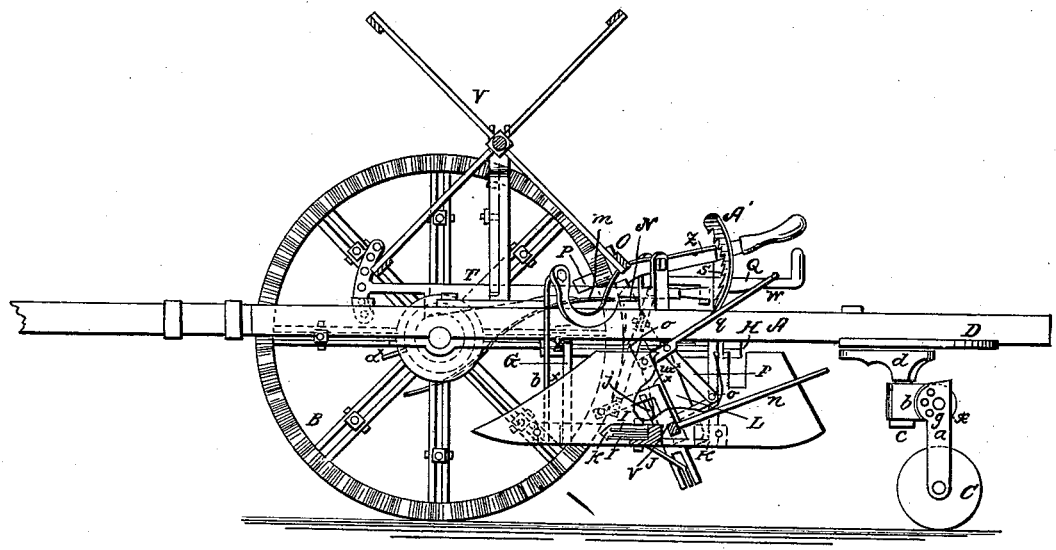
Fig. 2.
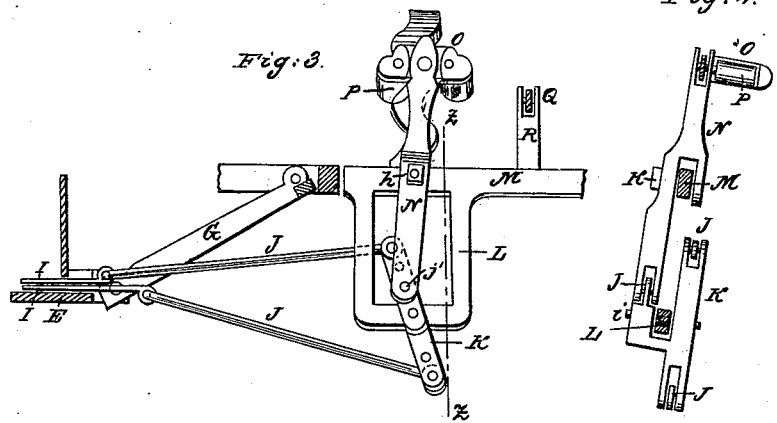
Fig. 3.
Fig. 4.
Witnesses:
Theo Tusche.
J. A. Service.
Inventor:
D. S. Fisher
Per Munn & Co.
Attorneys.

United States Patent Office.

D. S. FISHER, OF CEDAR SPRING, INDIANA.

Letters Patent No. 73,314, dated January 14, 1868.

IMPROVEMENT IN HARVESTERS.

The Schedule referred to in these Letters Patent and making part of the same.

TO ALL WHOM IT MAY CONCERN:

Be it known that I, D. S. FISHER, of Cedar Spring, in the county of Harrison, and State of Indiana, have invented a new and improved Reaping and Mowing-Machine; and I do hereby declare that the following is a full, clear, and exact description thereof, which will enable others skilled in the art to made and use the same, reference being had to the accompanying drawings, forming part of this specification.

This invention relates to a new and improved reaping and mowing-machine of that class in which the sickle or sickles are driven by a cam and lever, in lieu of the ordinary crank and connecting-rod.

The invention consists in a peculiar construction of the sickle-driving apparatus, grain-discharging device, and adjustable wheels on the main frame, as hereinafter fully shown and described, whereby a very superior reaper and mower of the class specified is obtained. In the accompanying drawings—

Figure 1, Sheet No. 1, is a plan or top view of my invention.

Figure 2, a side sectional view of the same, taken in the line $x\, x$, fig. 1.

Figure 3, a vertical section of a portion of the same, taken in the line $y\, y$, fig. 1.

Figure 4, a vertical section of fig. 3, taken in the line $z\, z$.

Similar letters of reference indicate like parts.

A represents a V-shaped frame, the front part of which is supported by a driving-wheel, B, and the rear part by two caster-wheels, C C, arranged in a novel manner, as follows: The standards $a$, in which the wheels C are fitted, are pivoted at their upper ends to arms $b$, which are fitted loosely on wrists $c$ at the outer ends of bars $d$, the front ends of the bars $d$ being secured by pivot-bolts $e$ to the frame A. These bars $d$ may be turned either to the right or left, and secured at any desired point within the scope of their movement by a pin, $f$, in their outer ends, said pins being fitted in any of a series of holes in segment-plates D, attached to the under side of frame A. The upper ends of the standards $a$ of the caster-wheels have their front sides made in semicircular form, and perforated with a series of holes, $g$, a hole being made in the arms $b$, and through any of the holes $g$ and the hole in the arm $b$, a pin, $g^\times$, is passed, to secure the standard, either in an upright or in an inclined position, according as it may be desired to have the rear part of frame A adjusted higher or lower. This will be fully understood by referring to fig. 2. E represents the cutter-bar, the inner end of which has a cross-bar, F, attached to it, and the ends of the bar F are fitted loosely in the lower part of a frame, G, the upper part of which is suspended to a metal fixture, H, attached to frame A. By this means a double-jointed connection is obtained for the cutter-bar E, so that either end of the same may be raised, or the cutter-bar raised bodily, as may be desired. Two sickles, I I, are employed, one placed over the other, and both provided with the ordinary V-shaped teeth $h$, as shown in fig. 1. The teeth of the two sickles work over or past each other like shears, and cut smoothly and perfectly. If fingers or guards are required, they may be applied to the cutter-bar, but it is probable that they would not be necessary. The inner ends of the bars of the sickles are connected by rods J J to the ends of a lever, K, which is secured by a central fulcrum-pivot, $i$, to the lower part of a projecting frame, L, on a shaft, M, and this lever K is connected above its fulcrum by a pivot, $j$, to the lower end of a vibrating-arm, N, which is attached by a central pivot, $k$, to the shaft M, as shown clearly in fig. 3. To the upper end of the vibrating-arm N there is pivoted a head, O, in which there are two parallel friction-rollers, P P, a roller being at each side of the rim of the driving-wheel B, which is of serpentine form, as shown clearly in figs. 1 and 3. This driving-wheel, therefore, it will be seen, is a cam, which through the medium of the levers, arm, and pivoted head, operates the two sickles. The sickles may be rendered inoperative at any time by drawing backward the upper end of the vibrating-arm N and roller-head O free from the serpentine rim of wheel B, which is accomplished by having a bar, Q, attached to an arm, R, on shaft M, said bar Q being notched, and passing through a guide, S, on a bar in frame A, (see more particularly fig. 1.) T is a lever at the left side of the driving-wheel B, and over a small wheel, $l$, on the axle of wheel B, said lever having a spring, $m$, at its under side, to keep it in a groove in the periphery of wheel $l$. This wheel $l$ has a projection, $a^\times$, at its periphery, which raises lever T once in every revolution, and this lever T, near its end, has a pendent arm, U, attached, the lower end of said arm being connected to a crank, $m^\times$, at the inner end of a shaft, V, which is at the rear end of the cutter-bar, and has fingers $n$ extending from its rear side to receive the grain as it is cut. Another crank, $o$, projects from the shaft V, and is connected by a rod, $p$, with the arm $q$ of a rod, W, which is parallel with the shaft V, and is some distance above the fingers $n$, over their rear parts.

Each time the lever T is raised by the projection $a^\times$ on wheel $l$, the fingers $n$ of the shaft V are thrown down, and the cut grain discharged therefrom, the rod W, during the depression of the fingers $n$, being also thrown down, so as to receive or hold the grain which is cut during the discharge of the cut grain from the fingers. The cut grain, however, may be discharged at any time by raising lever T, which can be readily accomplished by the driver on his seat X, at the rear of the driving-wheel B. A reel, Y, of the usual form or construction, may be employed, and the inner end of the cutter-bar may be raised by a lever, Z, on the frame A, said lever being connected to the inner end of the cutter-bar by a rod, $b^\times$, and the lever retained at any point within the scope of its movement by a toothed segment, A'. The cutter-bar may be sustained at one or both ends by a caster-wheel, B', arranged in precisely the same way as the caster-wheels C C at the rear of the frame A.

Having thus described my invention, I claim as new, and desire to secure by Letters Patent—

1. The combination of the caster-wheel C, pivoted adjustable standard $a$, pivoted arm $b$, pivoted bar $d$, and perforated horizontal segment-plates D, whereby the rear end of the frame and cutters is raised and lowered, and the direction of the harvester changed, as herein shown and described.

2. The combination of the projection $a^\times$, grooved wheel $l$, spring $m$, lever T, pendent arm U, crank $m^\times$, shaft V, rod $p$, arm $q$, rod W, and fingers $n$, as herein described, for the purpose specified.

3. The combination of the pivoted shaft M, frame L, and lever Q, with the vibrating-arm N, having the pivoted head O and rollers P, the lever K, and connecting-rods J, all constructed and arranged as described, whereby the vibrating-arm is thrown in and out of gear with the driving-wheel B, as herein shown and described, for the purpose specified.

D. S. FISHER.

Witnesses:
J. EMMET ENLOW,
GEO. W. LAMB.